United States Patent Office 3,450,488
Patented June 17, 1969

---

3,450,488
EVAPORATION RETARDANTS BASED ON BLENDS OF ALCOHOLS CONTAINING ODD AND EVEN NUMBERS OF CARBON ATOMS AND METHOD OF USE
Russell G. Dressler, 204 Carolwood Drive, San Antonio, Tex. 78213
No Drawing. Continuation-in-part of application Ser. No. 529,634, Feb. 24, 1966, now abandoned. This application Jan. 31, 1967, Ser. No. 612,820
Int. Cl. B01j *1/18*
U.S. Cl. 21—60.5                    10 Claims

ABSTRACT OF THE DISCLOSURE

Evaporation retardant method and composition based on a binary blend of a normal saturated alcohol having an even number of carbon atoms ranging from 16 to 22 with its next adjacent higher homolog.

---

This application is a continuation-in-part of my co-pending application Ser. No. 529,634 of Feb. 24, 1966, and now abandoned.

This invention relates to an improved evaporation retardant and a method for retarding evaporation of water from water surfaces exposed to the atmosphere, and particularly from large open bodies such as reservoirs and irrigation ditches having extended surfaces normally in contact with the open air.

Considerable studies have been conducted in connection with the use of monomolecular films of higher alcohols to retard evaporation of water. Russell G. Dressler, in U.S. Patent 2,903,330, issued Sept. 8, 1959, teaches the use of fatty alcohols containing 12–24 carbon atoms as evaporation retardants. Preferred in the Dressler patent are alcohols containing an even number of carbon atoms such as octadecanol. U.S. Patent 2,925,318, issued Feb. 16, 1960, Francis W. Crawford et al., teaches the use, in evaporation retardation, of long chain primary alcohols containing an uneven number of carbon atoms.

Since large areas of water and constant application of specialized chemicals are usually involved in evaporation control, the highest possible degree of efficiency in such an operation is desirable.

It is an object of this invention to provide an evaporation retardant having improved efficacy, that is, a high degree of evaporation retardation per usage unit. It is a further object of this invention to provide an evaporation retardation method having improved efficacy.

These and other objects are achieved with an evaporation retardant binary blend of normal saturated alcohols selected from the group consisting of:

hexadecanol and heptadecanol ($C_{16}$ and $C_{17}$);
heptadecanol and octadecanol ($C_{17}$ and $C_{18}$);
octadecanol and nonadecanol ($C_{18}$ and $C_{19}$);
nonadecanol and eicosanol ($C_{19}$ and $C_{20}$);
eicosanol and heneicosanol ($C_{20}$ and $C_{21}$);
heneicosanol and docosanol ($C_{21}$ and $C_{22}$);
docosanol and tricosanol ($C_{22}$ and $C_{23}$);

and with the use of such blends to retard evaporation from water surfaces which are exposed to the atmosphere, e.g., from a body of open water having an extended surface normally in contact with the open air.

The evaporation retardant blends of this invention have a molar ratio of alcohols with odd numbers of carbon atoms to alcohols with even numbers of carbon atoms in the range of about 75:25 to about 5:95. Such blends provide evaporation retardation which is unexpectedly and significantly greater than the use of an equal quantity of the individual alcohols used alone. Especially preferred and superior results are obtained by blends of nonadecanol and eicosanol in a molar ratio range of 50:50 to 15:85, with the 25:75 ratio being most preferred and by blends of docosanol and tricosanol in a molar ratio range of 75:25 to 3:5.

The alcohol blends of this invention are used to retard evaporation from a body of water by applying the blends in an amount sufficient to form a retardant film at least monomolecular in thickness on the surface of the water. Amounts greater than necessary to form such a monomolecular film can be used but are unnecessary since the monomolecular film provides effective evaporation retardation. Moreover, on such bodies of water the natural tendency of the applied alcohol blends is to spread to form such a molecular film. Under certain wind conditions, however, there can be some piling up of the alcohol and the films having a thickness greater than monomolecular can result. Moreover, slight overusage is usually preferable to insure an overall film, at least monomolecular in thickness. Films thicker than monomolecular are effective in retarding evaporation.

While it is not desired to be bound by theory, it is believed that the use of odd and even carbon chain alcohol blends in water surface treatment results in a situation where the respective molecules of the two types of alcohol float in a vertical relationship to each other on the water's surface. The molecules of the different alcohols can, therefore, interlock, at different elevations, into a much tighter barrier to evaporation than the molecules of the individual alcohols alone. Moreover, the alcohols in the blends of this invention appear to aid each other in spreading over the water surface. This desirable spreadability enhancement permits more effective evaporation control with the higher alcohols ($C_{18}$ and above) than was heretofore possible. Higher alcohols are often preferred because of their higher melting points which in turn make them more suitable for shipping, storage and handling in powdered or flaked form.

The alcohol blends are preferably applied to water surfaces in amounts ranging from 2.0 to 8.0 ounces per day per acre of water surface. However, since dosage to some extent is dependent on the size of the reservoir, and to a greater extent on the shape of the reservoir, on wind speeds, and on other factors, it is preferable to express the rate of application on a continuous basis, as, for example, 0.7 to 2.0 ounces of active alcohol blend per 50 lineal feet of upwind shoreline of the reservoir, per hour. When such an alcohol blend is applied at up-wind points the wind forces the floating film downwind and the natural spreading pressure of the alcohol blend spreads the film laterally, so that a continuously-maintained protective coverage results over the entire surface of the reservoir. As wind speeds increase above average wind conditions, application may be increased on the basis of about 3% additional alcohol blend per increased wind speed expressed in miles per hour. Average wind is defined at 5 m.p.h.

The alcohol blends of this invention can be applied to water surfaces in any of a number of ways. Cakes of the alcohol, i.e., mounted on a raft can be floated on the surface. Alcohol in dry-powdered, beaded, flake form or in molten form, or in dissolved, dispersed or emulsified form in a liquid vehicle, can be dispensed from boats or aircraft. Liquid forms of the alcohol can also be applied to the water surface from sprays, drip cans, pipes or other applicators at or beneath the surface of the body of water. Powdered, flake or beaded alcohol can be applied in water soluble packets in the manner described in Belgian Patent 636,128.

A preferred method of application is that described in U.S. Patent 2,903,330 of Russell G. Dressler which employs an aqueous dispersion of fatty alcohol in finely divided form, the particle size of which is such that essentially the maximum dimension of the fatty alcohol particles is up to .05 inch and that the major proportion of the finely divided fatty alcohol has a particle size below .05 inch. This method of application is further discussed in "The Suspension Process for Reservoir Evaporation Control" by Russell G. Dressler, Industrial and Engineering Chemistry, vol. 56, July 1964, pages 36–9.

The alcohols used in the composition of this invention are normal straight chain, saturated alcohols and can be derived from either natural or synthetic sources.

The blended alcohol compositions of this invention can, if desired, employ diluents such as water or urea (to form adducts), solvents such as alcohol, dispersants such as sodium carboxymethyl cellulose, emulsifiers such as nonionic or anionic organic surfactants or anticaking agents but are not necessary. They are preferably employed as only binary alcohol blends. Small amounts, up to about 25%, of fatty alcohol homologues, e.g., any in the $C_{16}$–$C_{25}$ range, can be tolerated, however.

The evaporation retardant blends of this invention can be employed in a number of ways for water conservation. The most important is the application of the alcohol blends to surfaces of large bodies of open water such as reservoirs, lakes, irrigation ditches, water treatment plants and the like. Such application is especially important in arid areas where conservation of water is critical. In such usages, the advantages of this invention are readily appreciated because of the increased efficiency of water conservation per unit application of retardant.

Other situations in which the evaporation retardant of this invention can be employed to advantage include application of the alcohol blends: to thin layers of water such as those used on roofs for cooling; on freshly poured concrete for curing control; on snow fields utilized for water sources; on damp or moist soil in which plants are growing; or to the surface of water above flooded, growing crops, or for the purpose of calming or preventing evaporation of fresh or salt waters during high winds. (Use on flooded rice fields to increase rate of growth due to increased water temperature, i.e., 5° to 10° F. increase, and to control hurricanes. See "Time" Dec. 3, 1965, page 82.)

Efficiency in evaporation retardation can be measured very precisely in a testing technique which reproduces on a small scale evaporative conditions found in large water bodies. This technique employs round battery jars 9 inches in diameter containing a body of water to be tested for evaporation. This body is representative of larger bodies of water and has an extended surface in contact with open air. The jars are about half-full of water, the water having an 0.158 square meter circular surface area. For each run, a pair of jars are partially submerged in a constant temperature water bath and are placed side by side. One jar is a control and its water has no film; evaporation therefrom is normal. The other jar has a film of the evaporation retardant being tested on the surface of its water. The object of the test, therefore, is to determine the degree of water conservation achieved by the film of retardant being tested, based on a parallel, controlled comparison with a normal evaporation situation.

Evaporation tests are conducted under controlled conditions to eliminate all variables except the character of the evaporation retardant. The water surface temperature is maintained at 30° C. A constant flow of air, at 30° C. and predried to less than 5% relative humidity, is diffused over the water surface of the test and control jars. The air flow (about 12 cubic feet per minute) is designed to be approximately equivalent to one mile per hour wind in a natural atmospheric situation. The tests are 4 hours in duration, unless otherwise specified.

At the beginning of each run, 20 mg. of the evaporation retardant being tested, in dry, finely-divided form, is applied to the water surface area of each test jar forming a film thereon. This amount is greater than that needed to form a monomolecular film to insure the formation of a complete film on the test jar water surface. At the beginning and end of each run, a micro hook gauge, mounted above the water surface of the test and control jars is used to measure the water level to the nearest 0.001 inch. Thus, at the end of each run the water level differences in the test and control jars in inches are determined. Water loss in inches is readily convertible for the test and control to water loss in milliliters; likewise relative water losses are readily convertible into a water conservation percentage figure based on the relationship between the test jar results and the control jar results. Water conservation indicates the amount of water saved by the film and which otherwise would have evaporated.

The test procedure described above is also described in detail in an article in I&EC Product Research and Development, volume 4, page 206, September 1965, entitled "Evaporation Suppression by Monolayers on Aqueous Saline Solutions" by Forest A. Cheeves, Russell G. Dressler and William C. McGavock. The article is incorporated herein by reference.

The following examples illustrate the evaporation retardant blends of this invention and their use to retard evaporation. The above-described technique was used in Examples I–III (but modified slightly in Example III). The examples are illustrative of the invention but should not be considered limiting.

Example I

Evaporation tests were performed with octadecanol, nonadecanol and eicosanol, respectively, as the sole retardant, and with equimolar blends of octadecanol+nonadecanol and of nonadecanol+eicosanol. The results of the tests are shown in Tables A–E, and show clearly the unexpected and significant synergistic superiority in evaporation retardation with the blends. The most superior results were seen with the nonadecanol+eicosanol blend.

TABLE A.—EVAPORATION TESTS WITH OCTADECANOL

| Run No.: | Water Loss Control (C) Inches | Water Loss Control (C) Mls. | Water Loss Test (T) Inches | Water Loss Test (T) Mls. | (C-T) in inches | Percent Water Conservation |
|---|---|---|---|---|---|---|
| 1 | 0.060 | 57.6 | 0.029 | 27.8 | 0.031 | 51.6 |
| 2 | 0.060 | 57.6 | 0.028 | 26.9 | 0.032 | 53.3 |
| 3 | 0.061 | 58.6 | 0.030 | 28.8 | 0.031 | 50.8 |
| 4 | 0.061 | 58.6 | 0.029 | 27.8 | 0.032 | 52.4 |
| 5 | 0.063 | 60.5 | 0.029 | 27.8 | 0.034 | 53.9 |
| | | | | | | 52 (average) |

TABLE B.—EVAPORATION TESTS WITH NONADECANOL

| Run No.: | Water Loss Control (C) Inches | Water Loss Control (C) Mls. | Water Loss Test (T) Inches | Water Loss Test (T) Mls. | (C-T) in inches | Percent Water Conservation |
|---|---|---|---|---|---|---|
| 1 | 0.061 | 58.6 | 0.023 | 22.1 | 0.038 | 62.2 |
| 2 | 0.061 | 58.6 | 0.023 | 22.1 | 0.038 | 62.2 |
| 3 | 0.062 | 59.5 | 0.024 | 23.0 | 0.038 | 61.3 |
| 4 | 0.062 | 59.5 | 0.024 | 23.0 | 0.038 | 61.3 |
| | | | | | | 62 (average) |

TABLE C.—EVAPORATION TESTS WITH EICOSANOL

| Run No.: | Water Loss Control (C) Inches | Water Loss Control (C) Mls. | Water Loss Test (T) Inches | Water Loss Test (T) Mls. | (C-T) in inches | Percent Water Conservation |
|---|---|---|---|---|---|---|
| 1 | 0.062 | 59.5 | 0.023 | 22.1 | 0.039 | 62.9 |
| 2 | 0.062 | 59.5 | 0.021 | 20.2 | 0.041 | 66.1 |
| 3 | 0.062 | 59.5 | 0.022 | 21.1 | 0.040 | 64.5 |
| 4 | 0.061 | 58.6 | 0.022 | 21.1 | 0.039 | 63.9 |
| 5 | 0.061 | 58.6 | 0.021 | 20.2 | 0.040 | 65.6 |
| | | | | | | 65 (average) |

TABLE D.—EVAPORATION TESTS WITH EQUIMOLAR MIXTURE OF OCTADECANOL AND NONADECANOL

|  | Water Loss Control (C) | | Water Loss Test (T) | | Percent Water Conservation |
|---|---|---|---|---|---|
|  | Inches | Mls. | Inches | Mls. |  |
| Run No.: |  |  |  |  |  |
| 1 | .063 | 60.61 | .019 | 18.28 | 69.9 |
| 2 | .061 | 58.68 | .019 | 18.28 | 68.9 |
| 3 | .061 | 58.68 | .018 | 17.32 | 70.0 |
| Averages | .062 | 59.32 | .019 | 17.96 | 69.6 |

TABLE E.—EVAPORATION TESTS WITH EQUIMOLAR MIXTURE OF NONADECANOL AND EICOSANOL

|  | Water Loss Control (C) | | Water Loss Test (T) | | Percent Water Conservation |
|---|---|---|---|---|---|
|  | Inches | Mls. | Inches | Mls. |  |
| Run No.: |  |  |  |  |  |
| 1 | .061 | 58.68 | .016 | 15.39 | 73.7 |
| 2 | .062 | 59.64 | .015 | 14.43 | 75.8 |
| 3 | .062 | 59.64 | .015 | 14.43 | 75.8 |
| Averages | .062 | 59.32 | .015 | 14.75 | 75.1 |

Example II

Evaporation tests were performed with mixtures of nonadecanol and eicosanol in various molar ratios. The results of the tests are shown in Table F and demonstrate clearly the synergism involved in blending these alcohols. Moreover, the outstanding efficacy of the 25:75 molar ratio of this alcohol is illustrated.

TABLE F.—EVAPORATION TESTS WITH NONADECANOL PLUS EICOSANOL

| Alcohol Mixture | | Water Loss in inches | | Water Loss in ml. | | Percent water conservation | Average Percent water conservation |
|---|---|---|---|---|---|---|---|
|  |  | With Film | No Film | With Film | No Film |  |  |
| Run No.: |  |  |  |  |  |  |  |
| 1 | Pure nonadecanol | .023 | .061 | 22.13 | 58.68 | 62.4 | |
| 2 |  | .023 | .061 | 22.13 | 58.68 | 62.4 | 61.8 |
| 3 |  | .024 | .062 | 23.09 | 59.64 | 61.4 | |
| 4 |  | .024 | .062 | 23.09 | 59.64 | 61.4 | |
| 1 | Nonadecanol plus eicosanol in 75:25 molar ratio | .020 | .060 | 19.24 | 57.72 | 66.6 | |
| 2 |  | .020 | .060 | 19.24 | 57.72 | 66.6 | 66.6 |
| 3 |  | .020 | .060 | 19.24 | 57.72 | 66.6 | |
| 1 | Nonadecanol plus eicosanol in 50:50 molar ratio | .016 | .061 | 15.39 | 58.68 | 73.7 | |
| 2 |  | .015 | .062 | 14.43 | 59.64 | 75.0 | 74.1 |
| 3 |  | .016 | .061 | 15.39 | 58.68 | 73.7 | |
| 1 | Nonadecanol plus eicosanol in 40:60 molar ratio | .015 | .061 | 14.43 | 58.68 | 75.0 | |
| 2 |  | .015 | .061 | 14.43 | 58.68 | 75.0 | 75.0 |
| 3 |  | .015 | .061 | 14.43 | 58.68 | 75.0 | |
| 1 | Nonadecanol plus eicosanol in 25:75 molar ratio | .012 | .060 | 11.54 | 57.72 | 80.0 | |
| 2 |  | .013 | .060 | 12.51 | 57.72 | 78.3 | 79.3 |
| 3 |  | .013 | .061 | 12.51 | 58.68 | 78.6 | |
| 1 | Nonadecanol plus eicosanol in 15:85 molar ratio | .016 | .060 | 15.39 | 57.72 | 73.3 | |
| 2 |  | .017 | .060 | 16.35 | 57.72 | 71.6 | 72.2 |
| 3 |  | .017 | .060 | 16.35 | 57.72 | 73.3 | |
| 1 | Pure eicosanol | .023 | .062 | 22.30 | 59.64 | 62.9 | |
| 2 |  | .021 | .062 | 20.20 | 59.64 | 66.1 | 64.1 |
| 3 |  | .022 | .062 | 21.16 | 59.64 | 63.6 | |
| 4 |  | .022 | .061 | 21.16 | 58.68 | 63.9 | |

Example III

Evaporation tests were performed with a nonadecanol+eicosanol blend, in a 25:75 molar ratio, at varying temperatures. Runs were made wherein the water surface and air temperatures both were 30° C., 25° C. and 20° C. respectively. The results of the test are shown in Table G and illustrate that the evaporation retardation effect of the blend is relatively independent of temperature.

TABLE G.—EVAPORATION TESTS WITH NONADECANOL PLUS EICOSANOL IN A MOLAR RATIO OF 75:25

|  | Temperature °C. | Water Loss in inches | | Water Loss in ml. | | Percent Water Conservation | Average Percent Water Conservation |
|---|---|---|---|---|---|---|---|
|  |  | With Film | No Film | With Film | No Film |  |  |
| Run No.: |  |  |  |  |  |  |  |
| 1 | 30 | .012 | .060 | 11.54 | 57.72 | 80.0 | |
| 2 |  | .013 | .060 | 12.51 | 57.72 | 78.3 | 79.3 |
| 3 |  | .013 | .061 | 12.51 | 58.86 | 78.6 | |
| 1 | 25 | .008 | .043 | 7.70 | 41.37 | 81.3 | |
| 2 |  | .008 | .043 | 7.70 | 41.37 | 81.3 | 81.3 |
| 1 | 20 | .006 | .034 | 5.77 | 32.71 | 82.3 | |
| 2 |  | .006 | .034 | 5.77 | 32.71 | 82.3 | 82.3 |

Example IV 13 parts by weight of a dry powdered blend of nonadecanol and eicosanol, in a molar ratio of 25:75, of approximately 60 micron particle size are added to 14 parts by weight of water and suspended therein, using a high-speed rotary mechanical agitator to facilitate the suspending operation. No suspending aids or agents are used. This mixture, containing about 48% by weight of solids in water, is on standing a thick, relatively stable paste, of consistency suitable for pumping by a heavy duty pump. This aqueous suspension is a superior evaporation retardant for bodies of water having surfaces exposed to the atmosphere.

Example V

A 40 acre water reservoir can be treated to retard evaporation as follows:

A stream of 30% by weight of the finely divided aqueous alcohol suspension of Example IV, as a concentrate, is diluted continuously by pumping water from the reservoir. The proportions are 2 ounces of concentrate per minute diluted by 2.5 gallons of reservoir water per minute (about 1:150 by weight ratio). This diluted stream is distributed by pump through lines laid along the upwind shoreline of the reservoir for some 500 yds. The lines have outlet orifices at 50 ft. intervals for equal rates of outlet of the diluted streams and their continuous application at these points on the surface of the reservoir.

In one hour of application, the complete reservoir surface can be coated with a monomolecular film; the film maintained as long as the application is continued. Comparisons of the untreated reservoir and of the treated reservoir show the saving of water to be in the range of 70% to 80% of the normal evaporation loss when such treatment is made.

Excellent results in evaporation retardation, similar to (but not quite as good as) those which can be achieved in practicing Examples IV and V are obtained if an equimolar blend of octadecanol+nonadecanol is substituted for the nonadecanol+eicosanol blend of those examples.

Example VI

Evaporation tests were performed with hexadecanol, heptadecanol and octadecanol, using the technique employed for Examples I–II. The results are shown in Table H.

TABLE H

| Alcohol: | Percent water conservation |
|---|---|
| Hexadecanol | 38.5 |
| Heptadecanol | 45.9 |
| Octadecanol | 52.4 |
| Hexadecanol+heptadecanol in equimolar proportions | 47.3 |
| Heptadecanol+octadecanol in equimolar proportions | 59.1 |

Evaporation tests for higher alcohols using the technique employed for Examples I–II were run with the following results:

TABLE I

| Alcohol: | Percent water conservation |
|---|---|
| Eicosanol | 65 |
| Heneicosanol | 16 |
| Docosanol | 79 |
| Tricosanol | 15 |

Example VII

Evaporation tests for higher alcohol blends using the technique employed for Examples I–II were run, except that the tests were 8 hours in duration. The results are shown in Table J.

TABLE J

| Alcohol blend | Molar Ratio | Percent Water Conservation |
|---|---|---|
| Eicosanol plus heneicosanol | 75:25 | 72 |
| Do | 25:75 | 70 |
| Docosanol plus tricosanol | 75:25 | 84 |
| Do | 25:75 | 85 |
| Do | 50:50 | 80 |
| Do | 62.5:37.5 | 85 |
| Do | 37.5:62.5 | 85 |
| Do | 87.5:12.5 | 80 |
| Do | 38.5:61.5 | 86 |

Example VIII

Further evaporation tests for higher alcohol blends using the technique employed for Examples I–II were run. The tests were 8 hours in duration. The results are shown in Table K.

TABLE K

| Alcohol blend | Molar Ratio | Percent Water Conservation |
|---|---|---|
| Heneicosanol plus docosanol | 25:75 | 76.0 |
| Do | 33:67 | 77.0 |
| Do | 50:50 | 80.2 |
| Do | 60:40 | 77.0 |
| Do | 67:33 | 75.4 |
| Do | 75:25 | 71.8 |

While the alcohol blends in these tests did not exhibit the same degree of synergism exhibited by other blends, they provided improved spreading rates over the surface of the water and improved film coverage relative to the pure alcohols.

Especially marked synergistic results are demonstrated by the following alcohol blends:

Octadecanol and nonadecanol in a mole ratio of about 1:1
Nonadecanol and eicosanol in a mole ratio of about 1:3
Heneicosanol and docosanol in a mole ratio of about 1:1
Docosanol and tricosanol in mole ratios of about 1:2 and 2:1.

Modifications can be made in this invention without departing from the spirit of it. The invention has been described in certain exemplary embodiments. What is claimed as new is:

1. An evaporation retardant composition consisting essentially of a binary blend of a normal saturated alcohol and its next adjacent higher homolog, said normal saturated alcohol being selected from the group consisting of hexadecanol, heptadecanol, octadecanol, nonadecanol, eicosanol, heneicosanol and docosanol; the molar ratio, in each blend, of alcohol with an odd number of carbon atoms to alcohol with an even number of carbon atoms ranging from about 75:25 to about 5:95.

2. The composition of claim 1, wherein the blend is of nonadecanol and eicosanol in a molar ratio range of 50:50 to 15:85.

3. The composition of claim 2, wherein the ratio is about 25:75.

4. The composition of claim 1, wherein the blend is of docosanol and tricosanol in a molar ratio range of 75:25 to 3:5.

5. In a method of retarding evaporation from a water surface which is normally exposed to the atmosphere by the formation of film of fatty alcohol on such a surface, at least monomolecular in thickness, the improvement step which comprises applying the composition of claim 1 to said body of water.

6. The method of claim 5 wherein the composition applied is that of claim 2.

7. The method of claim 5 wherein the composition applied is that of claim 3.

8. The method of claim 5 wherein the composition applied is that of claim 4.

9. The method of claim 5 wherein the composition is applied at the rate of about 2 to about 8 ounces per day per acre of water surface.

10. The method of claim 9 wherein the rate is increased 3% for each mile an hour of wind blowing over 5 miles per hour.

References Cited

UNITED STATES PATENTS

| | | | |
|---|---|---|---|
| 2,903,330 | 9/1959 | Dressler | 21—60.5 |
| 2,925,318 | 2/1960 | Crawford et al. | 21—60.5 |
| 3,082,058 | 3/1963 | Rosano | 21—60.5 |
| 3,085,850 | 4/1963 | Egan | 21—60.5 |
| 3,273,957 | 9/1966 | Beredjick | 21—60.5 |

MORRIS O. WOLK, Primary Examiner.

B. S. RICHMAN, Assistant Examiner.

U.S. Cl. X.R.

106—311; 252—380, 381